(12) United States Patent
Barina et al.

(10) Patent No.: US 7,254,040 B2
(45) Date of Patent: Aug. 7, 2007

(54) APPARATUS, SYSTEM, AND METHOD FOR CONNECTING AND DISCONNECTING A CIRCUIT CARD

(75) Inventors: Richard M. Barina, Sebring, FL (US); Norman Bruce Desroslers, Oxford, NC (US); Dean Frederick Herring, Youngsville, NC (US); Paul Andrew Wormsbecher, Apex, NC (US)

(73) Assignee: Lenovo Pte Ltd, Central 1 (SG)

( * ) Notice: Subject to any disclaimer, the term of this patent is extended or adjusted under 35 U.S.C. 154(b) by 0 days.

(21) Appl. No.: 11/242,569

(22) Filed: Oct. 3, 2005

(65) Prior Publication Data

US 2007/0076399 A1    Apr. 5, 2007

(51) Int. Cl.
*H05K 7/14* (2006.01)
*H05K 7/18* (2006.01)

(52) U.S. Cl. .................. 361/801; 361/754; 361/759

(58) Field of Classification Search ............... 361/801, 361/615, 673, 719, 720, 721, 726, 736, 740, 361/747, 754, 759, 798
See application file for complete search history.

(56) References Cited

U.S. PATENT DOCUMENTS

| | | | | |
|---|---|---|---|---|
| 3,829,741 A | * | 8/1974 | Athey | 361/756 |
| 6,027,358 A | * | 2/2000 | Lai et al. | 439/327 |
| 6,195,266 B1 | * | 2/2001 | Padgett et al. | 361/799 |
| 6,208,514 B1 | * | 3/2001 | Stark et al. | 361/704 |
| 6,236,573 B1 | * | 5/2001 | Gundlach et al. | 361/801 |
| 6,381,148 B1 | * | 4/2002 | Daskalakis et al. | 361/801 |
| 6,817,875 B2 | * | 11/2004 | Chang et al. | 439/159 |

* cited by examiner

*Primary Examiner*—Tuan Dinh
*Assistant Examiner*—Hung S. Bui
(74) *Attorney, Agent, or Firm*—Kunzler & McKenzie

(57) ABSTRACT

An apparatus, system, and method are disclosed for connecting and disconnecting daughter cards. A handle urges a locking member toward a base comprising a stop and a channel. The channel may direct the locking member to a specified position. The locking member biases the catch and the biased catch engages with the stop. The stop and the channel of the base secure the locking member to the base. In addition, the handle urges the locking member away from the base. The handle also urges an actuator to unbias the catch. The handle further disconnects the locking member from the base as the unbiased catch does not engage the stop.

30 Claims, 8 Drawing Sheets

APPARATUS, SYSTEM, AND METHOD FOR CONNECTING AND DISCONNECTING A CIRCUIT CARD

BACKGROUND OF THE INVENTION

1. Field of the Invention

This invention relates to retaining a circuit card and more particularly relates to connection and disconnecting a circuit card.

2. Description of the Related Art

Circuit cards are typically retained within an enclosure or system using one or more retention devices such as brackets or the like. The retention devices may direct the circuit card to a connector, easing the engagement of the circuit card with the connector. In addition, the circuit card may provide physical support to the circuit card.

Circuit cards are often retained using industry standard retention devices. For example, industry standards such as the Peripheral Component Interconnect ("PCI") defined by the Peripheral Component Interconnect Industrial Computer Manufacturers Group of Wakefield, Massachusetts may define connection standards. In addition, standards may specify retention devices. For example, the PCI Mezzanine Card ("PMC") standard P1386.1 defined by the Institute of Electrical and Electronic Engineers of New York specifies retention devices and criteria for circuit cards employing the PCI standard.

Unfortunately, a system or enclosure may need to retain a circuit card in a configuration not supported by a suitable industry standard retention device. For example, the system may not be able to retain and connect a daughter card on a mother card that does not support industry standard retention devices because of space or other considerations. The daughter card must instead be connected without the benefit of direction from retention devices to align a daughter card connector with a mother card connector. In addition, the daughter card may be inadequately retained such that forces exerted on the daughter card may damage the daughter card or the mother card.

Circuit cards may also be difficult to connect and disconnect. For example, a circuit card may be difficult to align and secure to a connector. In addition, a user may have difficulty disconnecting and removing a properly secured circuit card because of problems releasing any mechanisms securing the circuit card. Connecting and disconnecting the circuit card may be a particular problem when for a daughter card connected to a mother card as the mother card may be less tolerant of the physical forces required to connect and disconnect the daughter card.

From the foregoing discussion, it should be apparent that a need exists for an apparatus, system, and method that retain circuit cards in non-standard configurations and that allows easy connection and disconnection of the circuit cards. Beneficially, such an apparatus, system, and method would connect, retain, and disconnect circuit cards including when standard retention devices are unavailable.

SUMMARY OF THE INVENTION

The present invention has been developed in response to the present state of the art, and in particular, in response to the problems and needs in the art that have not yet been fully solved by currently available circuit card retention methods. Accordingly, the present invention has been developed to provide an apparatus, system, and method for retaining circuit cards that overcome many or all of the above-discussed shortcomings in the art.

The apparatus to connect and disconnect circuit cards is provided with a logic unit containing a plurality of components configured to functionally execute the necessary steps of urging a locking member to connect, biasing a catch, engaging a stop, urging the locking member to disconnect, unbiasing the catch, and disconnecting the locking member. These components in the described embodiments include a locking member, a base, a handle, and an actuator.

The locking member includes a catch and is configured to bias the catch by urging the catch is a specified direction. In one embodiment, the locking member is configured as a spring. In a certain embodiment, the locking member is configured as a U-shaped spring. The U-shaped spring may be fabricated as a single piece of metal or the like bent about a distal end with an inner arm comprising a first proximal end connected to the handle and an outer arm with a second proximal end.

The handle urges the locking member to connect with the base. The base includes a channel that receives the locking member. In one embodiment, the channel directs the locking member to connect with the base. The channel further includes a stop that engages the biased catch wherein the channel and the stop secure the locking member to the base. The actuator is disposed the handle. In addition, the actuator is configured to unbias the catch responsive to the urging of the handle from the base such that the stop does not engage the catch as the locking member disconnects from the base.

A system of the present invention is also presented to connect and disconnect a circuit card. The system may be embodied in an electronics enclosure such as a server enclosure or the like. In particular, the system, in one embodiment, includes an enclosure, a mother card, a daughter card, a locking member, a base, and a handle.

The enclosure comprises the mother card. The base is disposed on a planar surface of the mother card and includes a channel that receives the locking member and a stop that engages the biased catch. The channel and the stop secure the locking member to the base. The handle includes a proximal and a distal end corresponding to a proximal and distal end of the daughter card and is disposed on the top edge of the daughter card. The locking member is disposed near a proximal edge of the daughter card. In addition, the locking member comprises a catch.

The proximal end of the handle is coupled to the locking member. The handle urges the locking member to connect with the base as the handle urges the daughter card toward the mother card. In addition, the handle urges the locking member from the base and urges the actuator to unbias the catch as the handle urges the daughter card from the mother card, disconnecting the locking member from the base.

In one embodiment, the system further includes a pivoting member, a latch, and an engaging member. The engaging member may be disposed on the mother card. The pivoting member may couple the distal end of the handle to the daughter card near the top distal corner of the daughter card such that the handle pivots about the pivoting member. The latch may be coupled to the handle near the distal end of the handle and engage the engaging member as the handle is urged toward the daughter card and pivots toward the daughter card. In addition, the latch may pivot towards the distal end of the daughter card and disengage from the engaging member as the handle is urged away from the daughter card and pivots away from the daughter card.

A method of the present invention is also presented for retaining a circuit card. The method in the disclosed embodiments substantially includes the steps necessary to carry out the functions presented above with respect to the operation of the described apparatus and system. In one embodiment, the method includes urging a locking member, biasing a catch, and engaging a stop. The method may also include urging the locking member, unbaising the catch, and disconnecting the locking member from the base.

A handle urges a locking member toward a base comprising a stop and a channel. The channel may direct the locking member to a specified position. The locking member biases the catch and the biased catch engages with the stop. The stop and the channel of the base secure the locking member to the base.

In addition, the handle urges the locking member away from the base. The handle also urges an actuator to unbias the catch. The handle further disconnects the locking member from the base as the unbiased catch does not engage the stop.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention connects and disconnects a circuit card such as a daughter card by engaging a catch of a locking member with stop of a base. In addition, the present invention disengages the catch and stop to disconnect circuit card as a handle urges the circuit card from the base. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
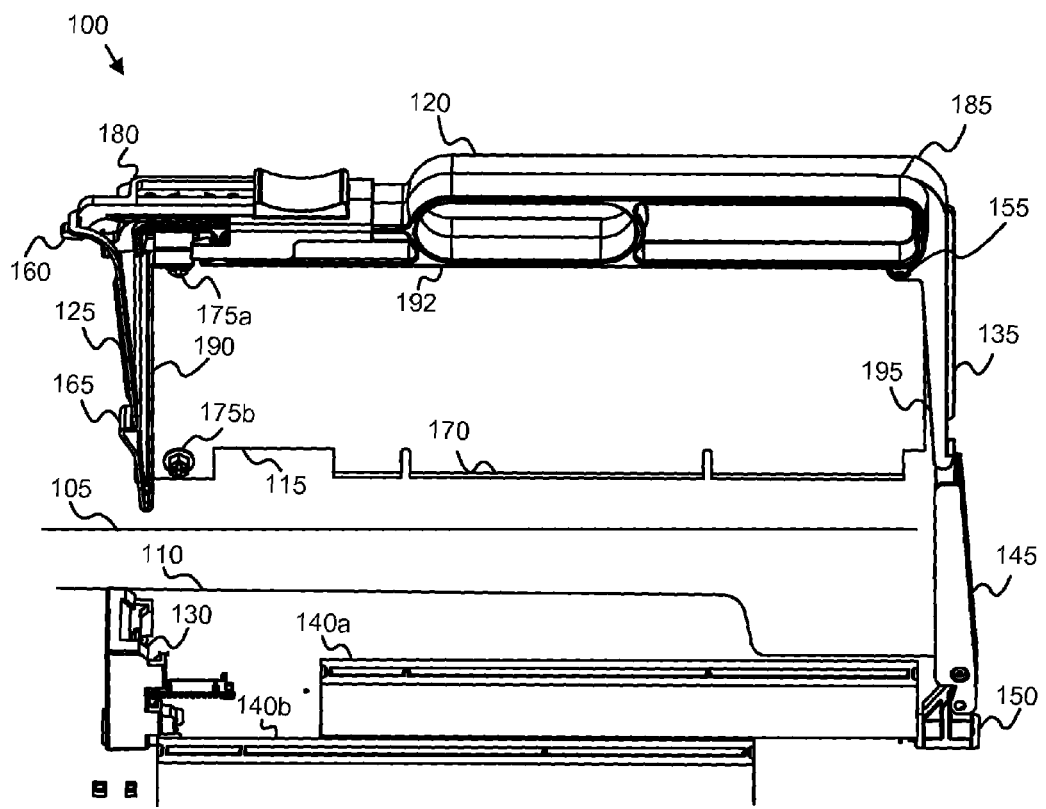
FIG. 1 is a perspective drawing illustrating one embodiment of an enclosure of the present invention.

FIG. 1 is a perspective drawing illustrating one embodiment of an enclosure 100 of the present invention. The enclosure 100 includes an enclosure wall 105, a mother card 110, a daughter card 115, a handle 120, a locking member 125, a base 130, one or more connectors 140, and an actuator 160. In one embodiment, enclosure further comprises a latch 135, a guide 145, a base 150, and a pivoting member 155.

The enclosure 100 comprises the mother card 110. In one embodiment, the mother card 110 is physically coupled to the enclosure 100. In addition, the mother card 110 may be electrically or optically coupled to one or more components of the enclosure 100 such as power supplies, circuit cards, and the like.

The base 130 is disposed on a planar surface of the mother card 110. The connectors 140 may also be disposed on the planar surface of the mother card 110. The handle 120 is disposed on the top edge 192 of the daughter card 115 and includes a proximal end 180 and a distal end 185 corresponding to a proximal end 190 and distal end 195 of the daughter card 115.

The proximal end 180 of the handle 120 is coupled to the locking member 125. The locking member 125 is disposed near the proximal end 190 of the daughter card 115. In one embodiment, the locking member 125 is further coupled to the daughter card 115. In the depicted embodiment, screws 175 couple the locking member 125 to the daughter card 115.

The handle 120 urges the locking member 125 to connect with the base 130 as the handle 120 urges the daughter card 115 toward the mother card 110. For example, the handle 120 may urge traces 170 on the daughter card 115 to a first connector 140a to connect the daughter card 115 to the mother card 110. In addition, the handle 120 urges the locking member 125 from the base 130 as the handle 120 urges the daughter card 115 from the mother card 110. For example, the handle 120 may urge the traces 170 from the first connector 170 to disconnect the daughter card 115 from the mother card 110.

In one embodiment, the pivoting member 155 couples the distal end 185 of the handle 120 to the daughter card 115 near the top distal corner of the daughter card 115 such that the handle 120 pivots about the pivoting member 165. The latch 135 may be coupled to the handle 120 near the distal end 185 of the handle 120. In addition, the engaging member 150 may be disposed on the mother card 110. In one embodiment, a limiting member limits the arc of the pivoting of the handle 120 about the pivoting member 155. In the depicted embodiment, the actuator 160 limits the pivoting of the handle 120.

Figure 2:
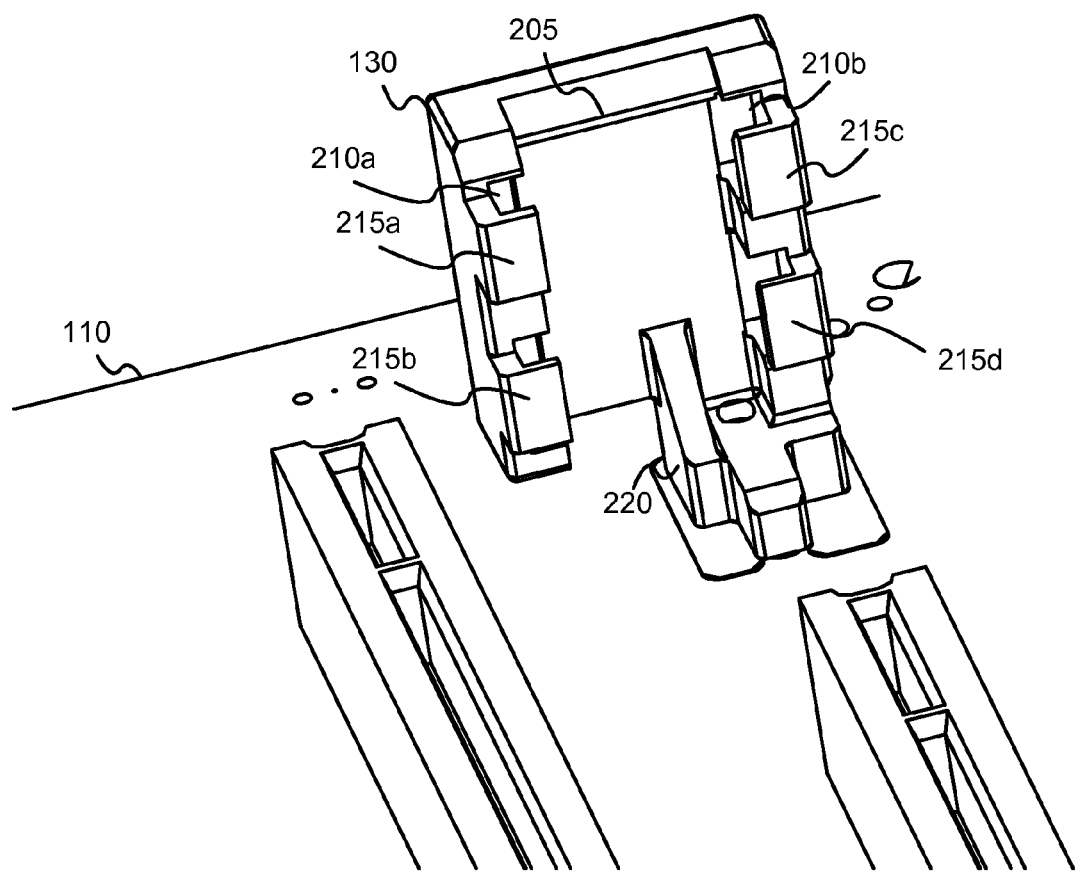
FIG. 2 is a perspective drawing illustrating one embodiment of a base in accordance with the present invention.

FIG. 2 is a perspective drawing illustrating one embodiment of a base 130 in accordance with the present invention such as the base 130 depicted in FIG. 1. In the depicted embodiment, the base 130 includes a stop 205 and one or more channels 210. One or more brackets 215 may form the channels 210.

The channels 210 are configured to received the locking member 125 and direct the locking member 125 to connect with the base 130. Although the base 130 is depicted with two coplanar channels 210, any number or arrangement of channels may be employed. The channels 210 prevent the locking member 125 from moving parallel to plane of the mother card 110. In one embodiment, the base 130 further comprises a support 220. The support 220 may prevent base 130 from rotating in response to a moment applied to the base 130.

Figure 3:
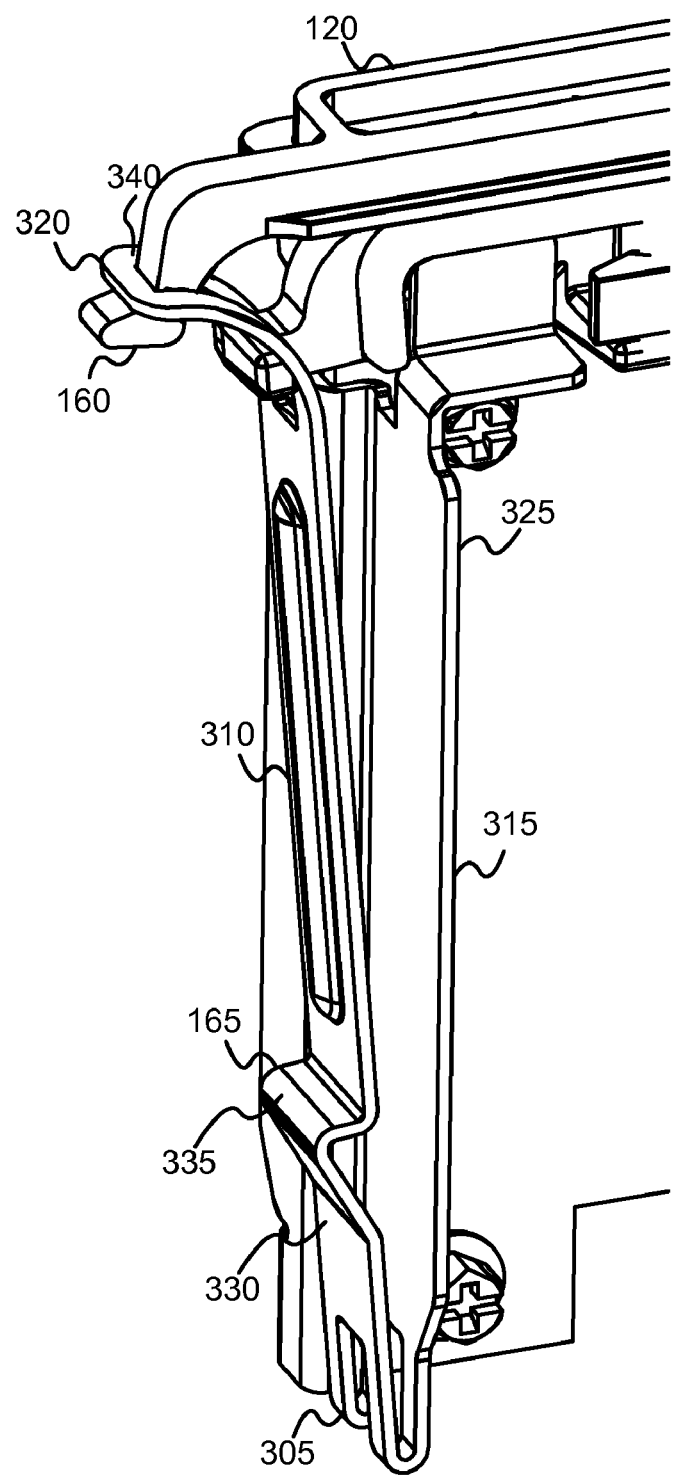
FIG. 3 is a perspective drawing illustrating one embodiment of a locking member of the present invention.

FIG. 3 is a perspective drawing illustrating one embodiment of a locking member 125 of the present invention. In the depicted embodiment, the locking member 125 is the locking member 125 depicted in FIG. 1. The locking member 125 includes a catch 165. In addition, the locking member 125 is configured to bias the catch 165 by urging the catch 165 is a specified direction. In the depicted embodiment, the locking member 125 urges the catch 165 longitudinally away from the daughter card 115, although the locking member 125 may bias the catch 165 in any direction. In addition, although the locking member is depicted with one catch 165, any number of catches 165 may be employed.

In one embodiment, the locking member 125 is configured as a spring. In a certain embodiment, the locking member 125 is configured as a U-shaped spring. The U-shaped spring may be fabricated as a single piece of metal or the like bent about a distal end 305 with an inner arm 315 comprising a first proximal end 325 connected to the handle 120 and an outer arm 310 with a second proximal end 310.

In the depicted embodiment, the catch 165 is configured as ramp with a minimum offset 330 from the daughter card 115 toward the distal end 305 of the locking member and a maximum offset 335 from the daughter card 115 toward the proximal end 320 of the outer arm 310. As the handle 120 urges the locking member 125 to connect with the base 130, the minimum offset 330 portion of the face of the catch 165 impacts the stop 205 depicted in FIG. 2. The urging of the handle 120 further causes the face of the catch 165 to slide along the stop 205 and urges the outer arm 310 to bend against the outer arm's 310 bias, unbiasing the catch 165.

As the maximum offset 335 of the catch 165 reaches and passes the stop 205, the outer arm 310 again biases the catch 165 and engaging the catch 165 with the stop 205. If the locking member 125 is urged from the base, the catch 165 impacts the stop 205. The engaged catch 165 and stop 205 and the one or more channels 210 depicted in FIG. 2 secure the locking member 125 to the base.

In one embodiment, the second proximal end 320 curves away from the first proximal end 325 such that the actuator 160 urges the second proximal end 320 toward the first proximal end 325 responsive to the urging of the handle 120 from the base 130, compressing the locking member 125 spring. In the depicted embodiment, the second proximal end 325 is configured with a grove 340 and the actuator 160 is formed in a T-shape such that the urging of the actuator 160 away from the base 130 compresses the locking member 125 spring. The compression of the locking member 125 spring unbiased the catch 165 as the handle 120 is urged away from the base 130, allowing the locking member 125 to disconnect from the base 130.

Figure 4:
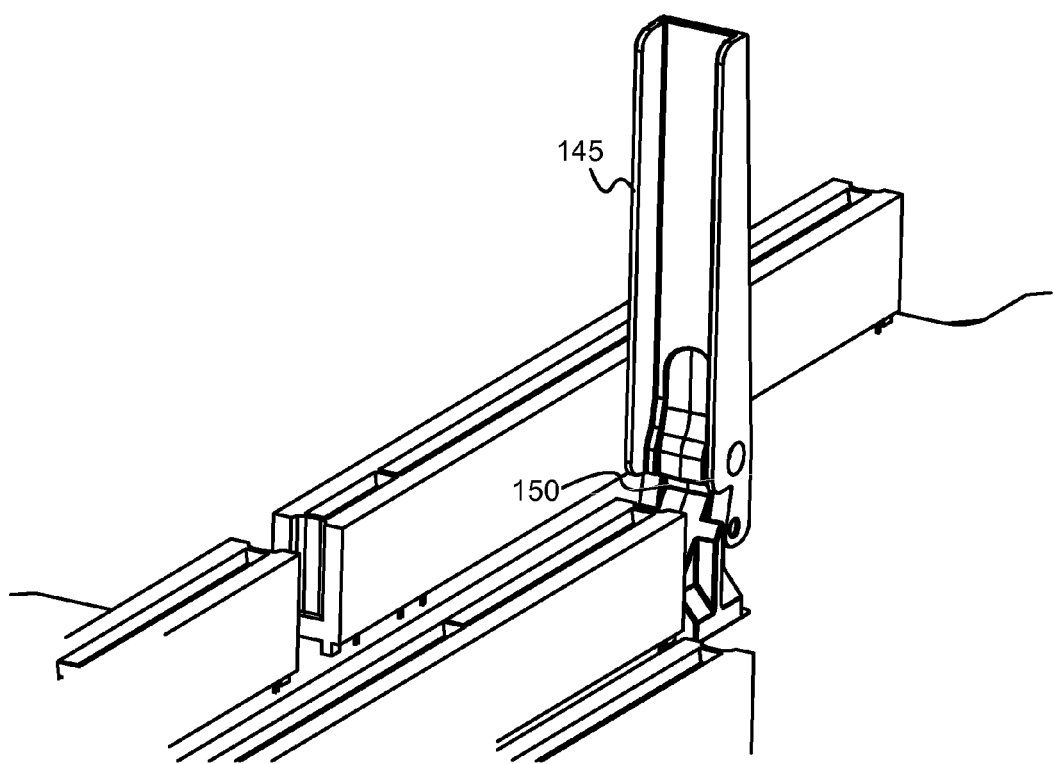
FIG. 4 is a perspective drawing illustrating one embodiment of an engaging member of the present invention.

FIG. 4 is a perspective drawing illustrating one embodiment of an engaging member 150 of the present invention. The depicted engaging member 150 is the engaging member 150 of FIG. 1. The engaging member 150 may engage the latch 135 to secure the handle 120 and the daughter card 115 to the mother card 110.

In one embodiment, the engaging member 150 includes a guide 145. The guide 145 is depicted in a receiving position. The guide 145 in the receiving position directs the latch 135 to engage with the engaging member 150 as the locking member 125 connects with the base 130 responsive to the urging of the handle 120. In one embodiment, the guide 145 is configured to swivel between a storage position parallel the mother card 110 and a receiving position perpendicular to the mother card 110.

Figure 5:
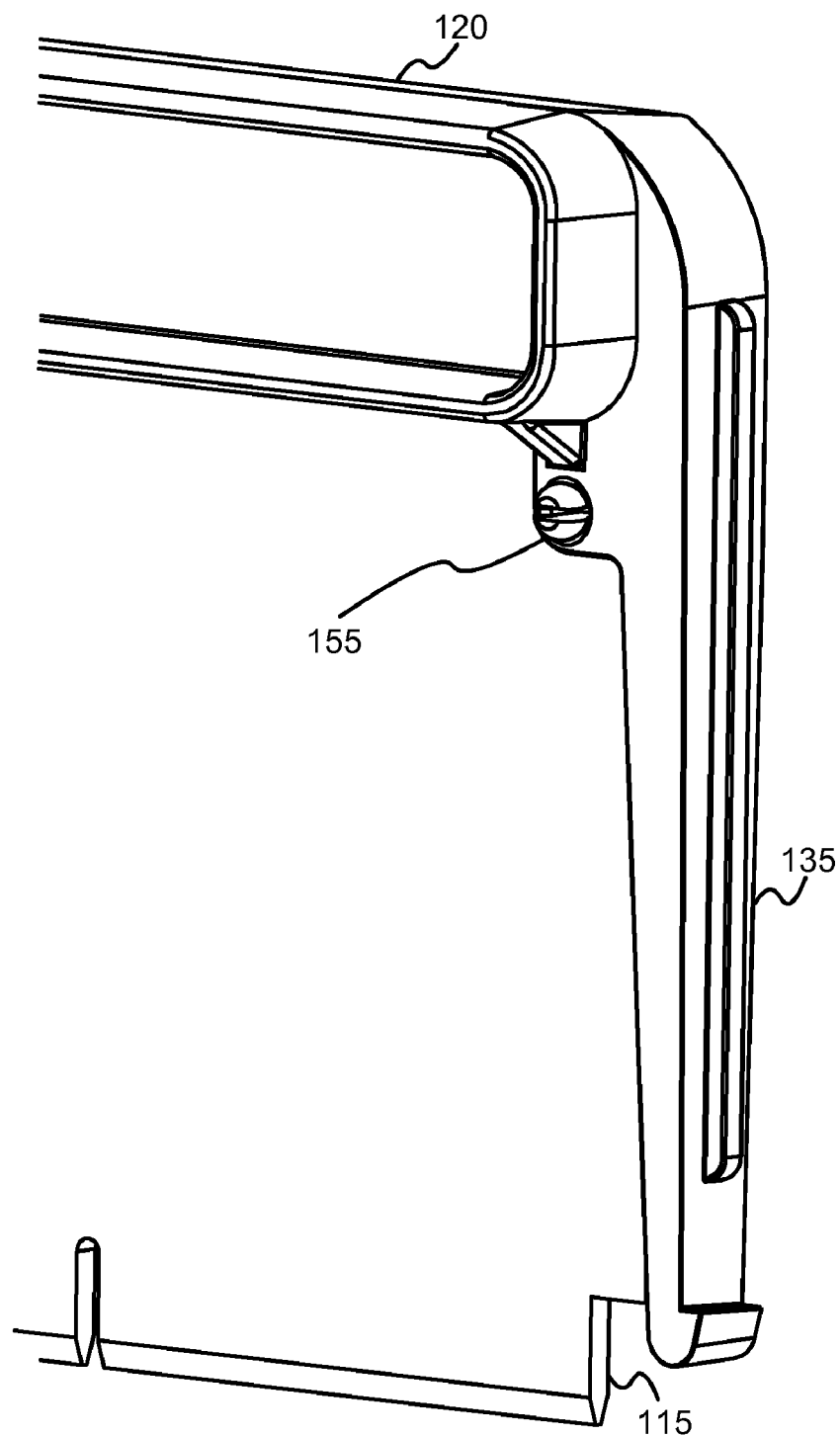
FIG. 5 is a perspective drawing illustrating one embodiment of a latch of the present invention.

FIG. 5 is a perspective drawing illustrating one embodiment of a latch 135 of the present invention. In the depicted embodiment, the latch 135 is the latch 135 depicted in FIG. 1. The latch 135 engages the engaging member 150 as the handle 120 is urged toward the daughter card 115. The handle 120 pivots about the pivoting member 155 as the handle 120 is urged toward the daughter card 115, pivoting the latch 135 away from the daughter card 115 such that the latch 135 is biased to engage the engaging member 150. The biased latch 135 engages the engaging member 150 as the handle 120 urges the latch 135 toward the mother card 110.

Urging the handle 120 from the mother card 110 such as to disconnect the daughter card 115 pivots the latch 135 towards the distal end 195 of the daughter card 115 as the handle 120 pivots away from the top of the daughter card 115. Pivoting the latch 135 toward the distal end 195 of the daughter card 115 disengages the latch from the engaging member 150 as the handle 120 is urged away from the daughter card 115. Thus the urging of the handle 120 from the mother card 110 also disengages the latch 135 from the engaging member 150 allowing the daughter card 115 to disconnect from the mother card 110 responsive to the urging of the handle 120.

Figure 6:
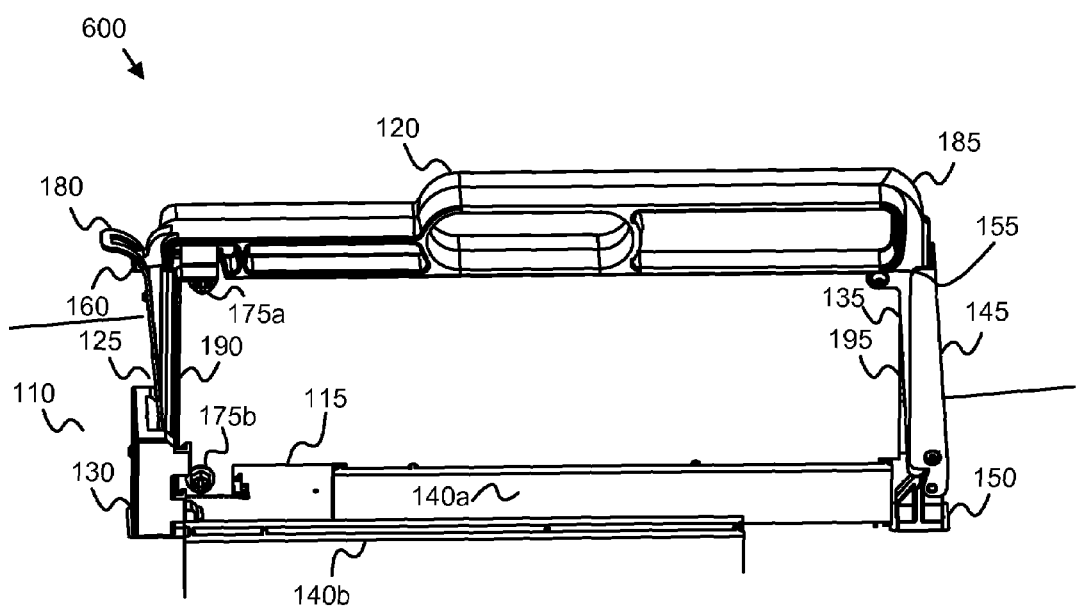
FIG. 6 is a perspective drawing illustrating one embodiment of a daughter card connected to a mother card of the present invention.

FIG. 6 is a perspective drawing illustrating one embodiment of the daughter card 115 of FIG. 1 connected to a mother card 110 of FIG. 1. The locking member 125 secures daughter card 115 to the mother card 110 to the base 130 with the engaged catch 165 and stop 205. In addition, the daughter card 115 may be further secured to the mother card 110 by the latch 135 engaging with the engaging member 150.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
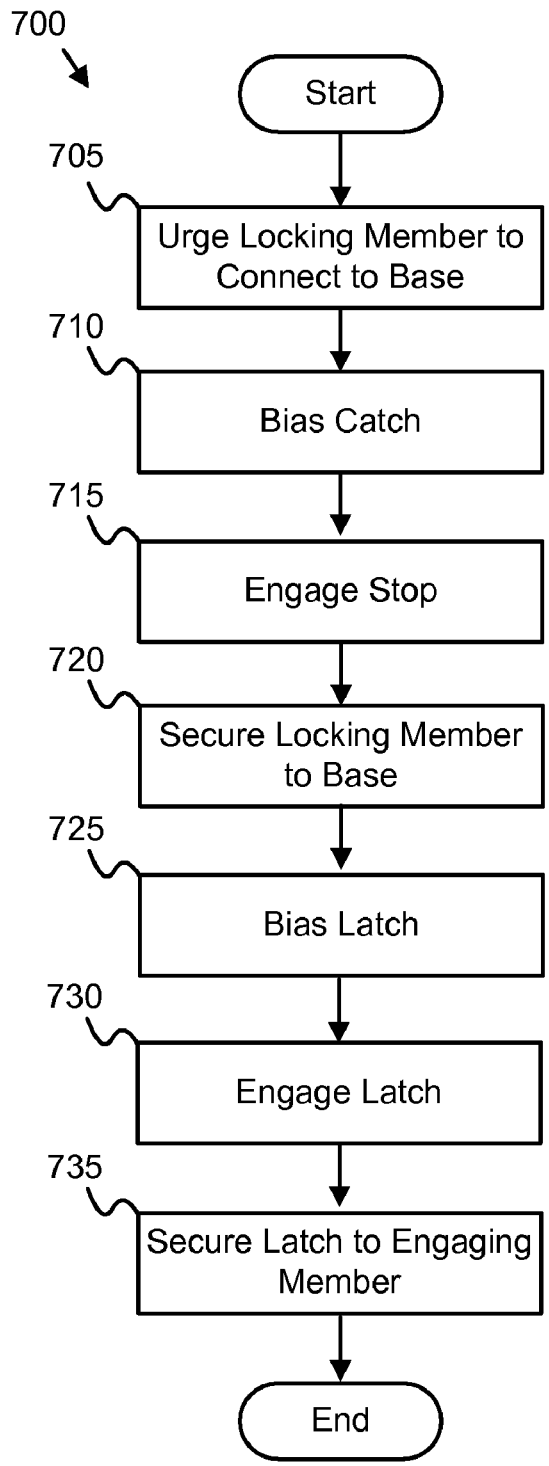
FIG. 7 is a schematic flow chart diagram illustrating one embodiment of a circuit card connection method in accordance with the present invention.

FIG. 7 is a schematic flow chart diagram illustrating one embodiment of a circuit card connection method 700 in accordance with the present invention. A handle 120 urges 705 a locking member 125 toward a base 130 comprising a stop 205 and a channel 210. The base 130 may be disposed on a mother card 110. In an alternate embodiment, the base 130 may be coupled to an enclosure wall 105. The channel 210 may direct the locking member 125 to a specified position. For example, the channel 210 may direct the locking member 125 such that a catch 165 of the locking member 125 is in position to engage the stop 205.

The locking member 125 biases 710 the catch 165 and the biased catch 165 engages 715 with the stop 205 as the locking member 125 connects with the base 130. The stop 205 and the channel 210 of the base 130 secure 720 the locking member 125 to the base 130.

In one embodiment, the handle 120 biases 725 a latch 135. The handle 120 may bias 725 the latch 135 as the handle 120 pivots about a pivoting member 155 while the handle 120 is urged toward a circuit card such as the daughter card 115 of FIG. 1 by pivoting the latch 135 away from a distal end 195 of the daughter card 115. In one embodiment, the biased latch 135 engages 730 an engaging member 150. The engaging member 150 may be disposed on the mother card 110. In an alternate embodiment, the engaging member 150 may be coupled to the enclosure 105. In a certain embodiment, the engaged latch 135 and engaging member 150 secure the circuit card such as the daughter card 115 to the mother card 110 by securing 735 the latch 135 to the engaging member 150. The secured 735 latch 135 and engaging member 150 may also secure the circuit card such as the daughter card 115 to the enclosure wall 105.

Figure 8:
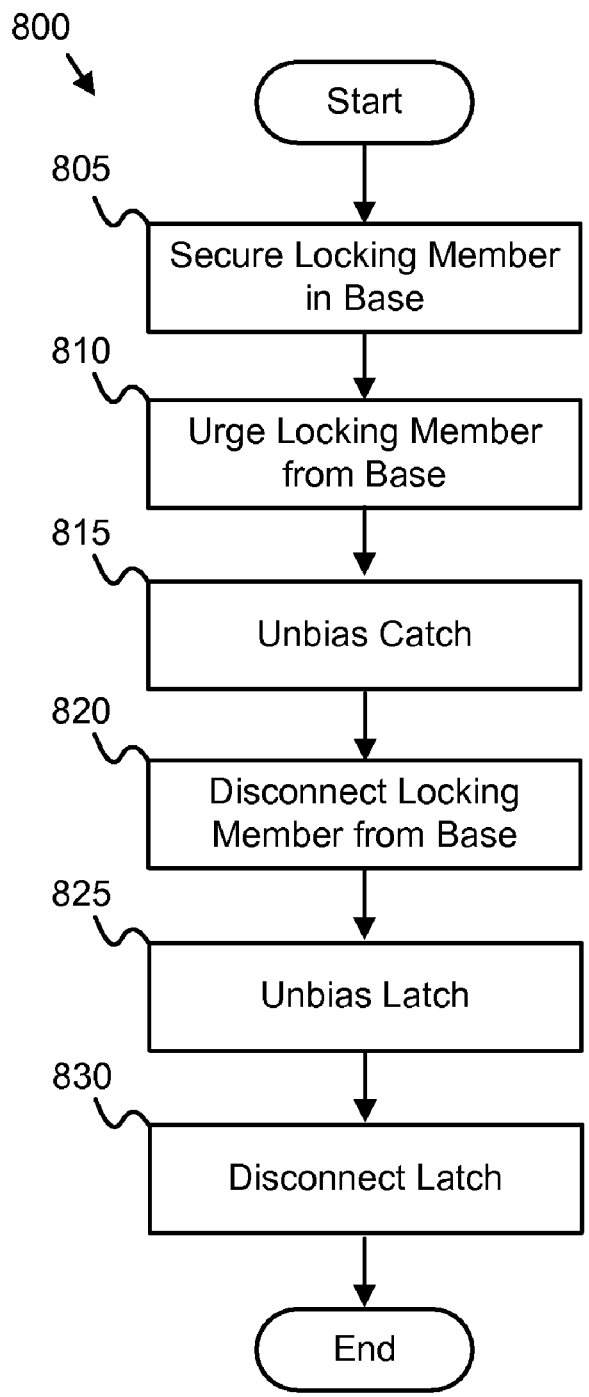
FIG. 8 is a schematic flow chart diagram illustrating one embodiment of a circuit card disconnection method of the present invention.

FIG. 8 is a schematic flow chart diagram illustrating one embodiment of a circuit card disconnection method 800 of the present invention. In one embodiment, a locking member 125 is secured 805 in a base 130. A handle 120 urges 810 the locking member 125 away from the base 130. The handle 120 may be coupled with a circuit card such as the daughter card 115 of FIG. 1. The base 130 maybe disposed on a circuit card such as the mother card 110 of FIG. 1. In an alternate embodiment, the base 130 is disposed on an enclosure such as the enclosure wall 105 of FIG. 1.

The handle 120 also urges an actuator 160 to unbias 815 a catch 165 engaged with a stop 205 disposed on the base 130. The handle 120 disconnects 820 the locking member 125 from the base 130 as the unbiased catch 205 does not engage the stop 205.

In one embodiment, the handle 120 further unbiases 825 a latch 135 from an engaging member 150. The handle 120 may unbias 825 the latch 135 by pivoting about a pivoting member 155 as the handle 120 is urged from a daughter card 115 coupled to the handle 120 by the pivoting member 155. The latch 135 may be coupled to the handle 120 such that the latch 135 pivots toward the daughter card 115 as the handle 120 pivots from the daughter card 115, unbiasing 825 the latch 135 from the engaging member 150. In one embodiment, the unbiased latch 135 disconnects 830 from the engaging member 150.

The method 800 may disconnect a circuit card coupled directly or indirectly to the locking member 125 by urging the handle 120 from the base 130 to disconnect 820 the locking member 125 from the base 130. In addition, the method 800 may disconnect the circuit card by disconnecting 830 the latch 135 from an engaging member 150 responsive to urging the handle 120 from the base 130.

The present invention connects and disconnects a circuit card such as a daughter card 115 by engaging a catch 165 of a locking member 125 with stop 205 of a base 130. In addition, the present invention disengages the catch 165 and stop 205 to disconnect circuit card as a handle 120 urges the circuit card from the base 130. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to connect and disconnect a daughter card, the apparatus comprising:

a locking member disposed near a proximal edge of a daughter card comprising a catch and configured to bias the catch;

a base disposed on a planar surface of a mother card and comprising a channel that receives the locking member and a stop that engages the biased catch wherein the channel and the stop secure the locking member to the base;

a handle with a proximal and a distal end disposed on the top edge of the daughter card, the proximal end of the handle coupled to the locking member and the handle configured to urge the locking member to connect with the base as the handle urges the daughter card toward the base and to urge the locking member to disconnect from the base as the handle urges the daughter card from the mother card; and an actuator disposed on the proximal end of the handle configured to unbias the locking member and disengage the catch from the stop responsive to the handle urging the daughter card from the mother card.

2. The apparatus of claim 1, wherein the locking member is configured as a spring that biases the catch longitudinally from the daughter card.

3. The apparatus of claim 2, wherein the locking member is configured as a U-shaped spring fabricated as a single piece bent about a distal end and an inner arm with a first proximal end connected to the handle and an outer arm with a second proximal end.

4. The apparatus of claim 3, wherein the catch is configured as ramp with a minimum offset from the daughter card toward the distal end of the locking member and a maximum offset from the daughter card toward the proximal end of the outer arm.

5. The apparatus of claim 4, wherein the outer arm flexes responsive to the ramp face of the catch moving over the stop toward the base to unbias the catch and allow the catch to engage the stop as the handle urges the locking member to connect with the base.

6. The apparatus of claim 5, wherein the second proximal end of the locking member curves away from the first proximal end of the locking member such that the actuator urges the second proximal end to compress the spring and unbias the catch as the handle is urged away from the base.

7. The apparatus of claim 1, further comprising a pivoting member configured to couple the distal end of the handle to the daughter card near the top distal corner of the daughter card such that the handle pivots about the pivoting member.

8. The apparatus of claim 7, further comprising a limiting member configured to limit the pivot arc of the handle.

9. The apparatus of claim 7, wherein the actuator and the locking member are configured to limit the pivot arc of the handle.

10. The apparatus of claim 7, further comprising a latch and an engaging member coupled to the mother card, the latch coupled to the handle near the distal end of the handle and configured to pivot away from the distal end of the daughter card and engage the engaging member as the handle pivots toward the daughter card wherein the engaged latch and engaging member secure the handle and the daughter card to engaging member and the latch further configured to pivot towards the distal end of the daughter card and disengage from the engaging member as the handle pivots away from the daughter card responsive to urging the handle from the mother card.

11. The apparatus of claim 10, further comprising a guide configured to swivel between a storage position parallel the mother card and a receiving position perpendicular to the mother card wherein the guide in the receiving position directs the latch to the engaging member as the locking member connects with the base responsive to the urging of the handle.

12. An apparatus to connect and disconnect a circuit card, the apparatus comprising:
    a locking member disposed near a proximal edge of a circuit card comprising a catch and configured to bias the catch;
    a base disposed on a planar surface of an enclosure and comprising a channel that receives the locking member and a stop that engages the biased catch wherein the channel and the stop secure the locking member to the base;
    a handle with a proximal and a distal end disposed on the top edge of the circuit card, the proximal end of the handle coupled to the locking member and the handle configured to urge the locking member to connect with the base as the handle urges the circuit card toward the base and to urge the locking member to disconnect from the base as the handle urges the circuit card from the enclosure surface; and
    an actuator disposed on the proximal end of the handle configured to unbias the locking member and disengage the catch from the base responsive to the handle urging the daughter card from the mother card.

13. A system to connect and disconnect a daughter card, the system comprising:
    an enclosure;
    a mother card disposed within the enclosure;
    a daughter card configured to connect to the mother card;
    a locking member disposed near a proximal edge of the daughter card comprising a catch and configured to bias the catch;
    a base disposed on a planar surface of the mother card and comprising a channel that receives the locking member and a stop that engages the biased catch wherein the channel and the stop secure the locking member to the base;
    a handle with a proximal and a distal end disposed on the top edge of the daughter card, the proximal end of the handle coupled to the locking member and the handle configured to urge the locking member to connect with the base as the handle urges the daughter card toward the base and to urge the locking member to disconnect from the base as the handle urges the daughter card from the mother card; and
    an actuator disposed on the proximal end of the handle configured to unbias the locking member and disengage the catch from the base responsive to the handle urging the daughter card from the mother card.

14. The system of claim 13, wherein the locking member is configured as a U-shaped spring that biases the catch longitudinally from the daughter card and is fabricated as a single piece bent about a distal end and an inner arm with a first proximal end connected to the handle and an outer arm with a second proximal end.

15. The system of claim 14, wherein the catch is configured as ramp with a minimum offset from the daughter card toward the distal end of the locking member and a maximum offset from the daughter card toward the proximal end of the outer arm of the locking member.

16. The system of claim 15, wherein the outer arm flexes responsive to the ramp face of the catch moving over the stop toward the mother card to unbias the catch and allow the catch to engage the stop as the handle urges the locking member to connect with the base.

17. The system of claim 16, wherein the second proximal end of the locking member curves away from the first proximal end of the locking member such that the actuator urges the second proximal end of the locking member to compress the spring and unbias the catch as the handle is urged away from the base.

18. The system of claim 17, further comprising a pivoting member configured to couple the distal end of the handle to the daughter card near the top distal corner of the daughter card such that the handle pivots about the pivoting member.

19. The system of claim 18, further comprising a limiting member configured to limit the pivot arc of the handle.

20. The system of claim 18, wherein the actuator and the locking member are configured to limit the pivot arc of the handle.

21. The system of claim 18, further comprising a latch and an engaging member coupled to the mother card, the latch coupled to the handle near the distal end of the handle and configured to pivot away from the distal end of the daughter card and engage the engaging member as the handle is urged towards and pivots toward the daughter card wherein the engaged latch and engaging member secure the handle and the daughter card to mother card and the latch further configured to pivot towards the distal end of the daughter card and disengage from the engaging member as the handle pivots away from the daughter card responsive to urging the handle from the mother card.

22. The system of claim 21, further comprising a guide disposed on the mother card configured to swivel between a storage position parallel the mother card and a receiving position perpendicular to the mother card wherein the guide in the receiving position directs the latch as the locking member connects with the base responsive to the urging of the handle.

23. A method for supporting an application for connecting and disconnecting a daughter card comprising: supporting the application, wherein the application is operable to perform the following functions:

urging a locking member comprising a catch and coupled with a handle coupled to a circuit card to connect to a base comprising a guide and a stop, the guide configured to receive the locking member;

biasing the catch to engage the stop;

securing the locking member in the base with the guide and the engaged catch and stop; and unbiasing the locking member and disengaging the catch from the stop responsive to the handle urging the daughter card from the mother card.

24. The method of claim 23, further comprising flexing the locking member responsive to the catch moving over the stop toward the base, unbiasing the catch, and again biasing the catch to engage the stop.

25. The method of claim 23, further comprising biasing a latch longitudinally away from the circuit card responsive to urging a handle disposed on the circuit card toward the circuit card, the handle coupled to the circuit card by a pivoting point such that urging the handle towards the circuit card biases the latch away from the circuit card.

26. The method of claim 23, further comprising engaging the biased latch with an engaging member.

27. A method for supporting an application for disconnecting a daughter card from a mother card comprising: support the application, wherein the application is operable to perform the following functions:

securing a locking member is a base, the locking member comprising a catch and coupled with a handle coupled to a circuit card, the base comprising a stop that engages the catch and a guide that receives the locking member;

urging the handle and locking member away from the base;

unbiasing the locking member and disengaging the catch from the stop responsive to the handle urging the daughter card from the mother card; and disconnecting the locking member from the base.

28. The method of claim 27, further comprising unbiasing a latch coupled to the handle from an engaging member wherein the latch pivots toward a distal end of the circuit card to disengage the engaging member as the handle is urged away from and pivots away from the circuit card.

29. The method of claim 28, further comprising disconnecting the unbiased latch from the engaging member.

30. An apparatus to connect and disconnect a daughter card, the apparatus comprising:

means for urging a locking member comprising a catch and coupled with a handle coupled to a daughter card to engage a base disposed on a mother card and comprising a guide and a stop, the guide configured to receive the locking member;

means for biasing the catch to engage the stop;

means for securing the locking member in the base with the guide and the engaged catch and stop;

means for urging the locking member away from the mother card;

means for unbaising the locking member and disengaging the catch from the base with an actuator disposed on the handle responsive to the handle urging the daughter card from the mother card; and means for disconnecting the locking member from the base.

* * * * *